United States Patent [19]

Silverman

[11] 4,064,481
[45] Dec. 20, 1977

[54] VIBRATOR AND PROCESSING SYSTEMS FOR VIBRATORY SEISMIC OPERATIONS

[76] Inventor: Daniel Silverman, 5969 S. Birmingham St., Tulsa, Okla. 74105

[21] Appl. No.: 617,857

[22] Filed: Sept. 29, 1975

Related U.S. Application Data

[63] Continuation-in-part of Ser. No. 407,646, Oct. 18, 1973, Pat. No. 3,984,805.

[51] Int. Cl.² ............................................. G01V 1/14
[52] U.S. Cl. ......................... 340/15.5 TA; 181/119; 340/17 R; 340/15.5 DP; 364/421
[58] Field of Search ............... 340/15.5 DP, 15.5 TA, 340/15.5 CC, 15.5 SC, 17 R; 235/181; 360/8, 32; 324/77 G; 181/119

[56] References Cited

U.S. PATENT DOCUMENTS

| | | | |
|---|---|---|---|
| 2,920,306 | 1/1960 | Feagin et al. | 235/181 |
| 3,326,320 | 6/1967 | Forester | 340/15.5 TA |
| 3,789,951 | 2/1974 | Silverman | 181/119 |
| 3,883,725 | 5/1975 | Fort et al. | 340/15.5 DP |

OTHER PUBLICATIONS

"The Pulsed Vibrator as a Seismic Source", Evison, *Geophysical Prospecting*, vol. 5, No. 4, Dec. 1957.

*Primary Examiner*—Howard A. Birmiel

[57] ABSTRACT

Method and apparatus for carrying out vibratory seismic operations and processing seismic records, involving generating a square wave analog sweep signal for driving a vibrator, generating a square wave analog, or 1 bit digitized transmitted signal, digitizing the received signal to 1 bit, and correlating the 1 bit digitized received signal with the 1 bit digitized transmitted signal, and stacking a plurality of such 1 bit correlograms. Simple logic means are disclosed for performing a 1 bit × 1 bit correlation. Means are disclosed for generating a square wave analog sweep signal.

20 Claims, 14 Drawing Figures

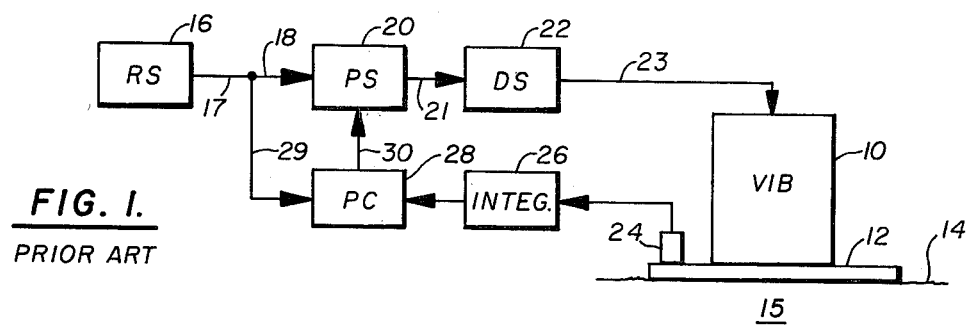
FIG. 1.
PRIOR ART
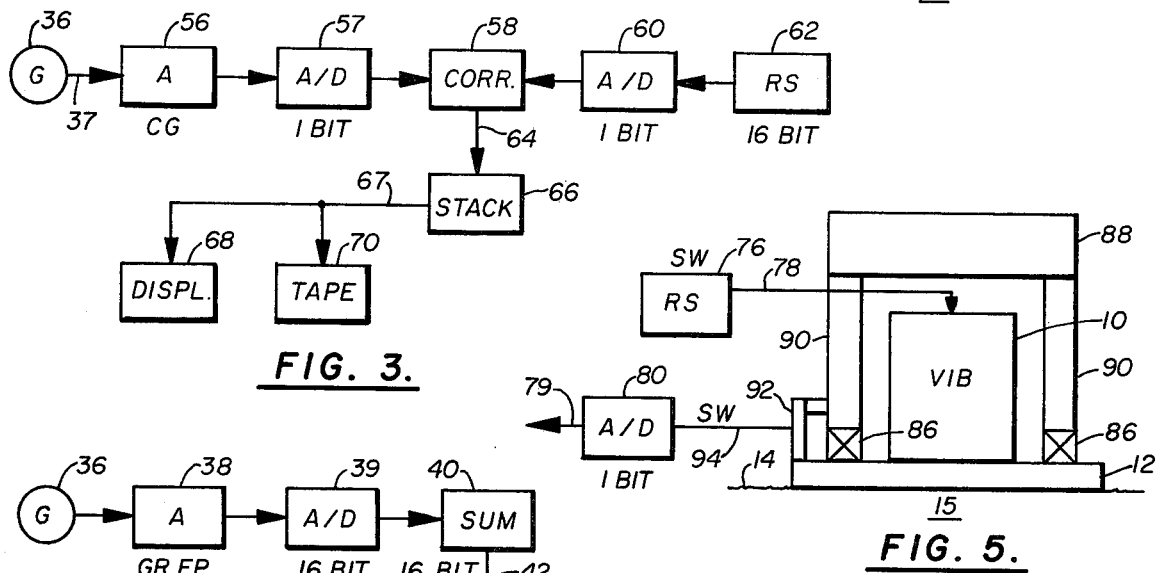
FIG. 3.
FIG. 5.
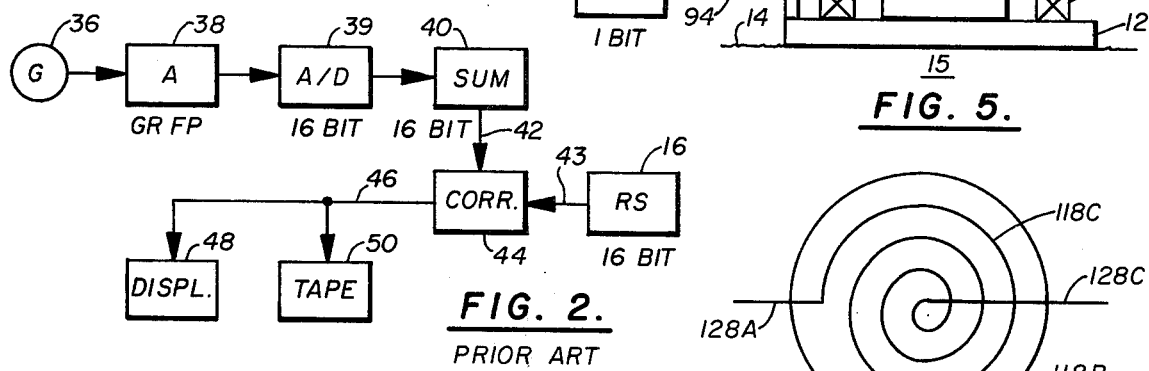
FIG. 2.
PRIOR ART
FIG. 6D.
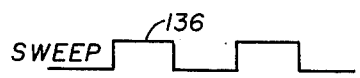
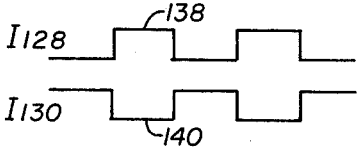
FIG. 6B.
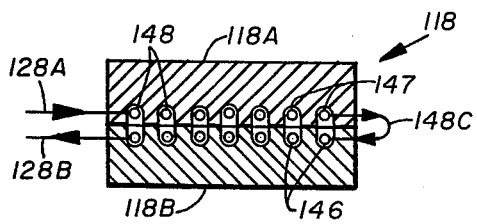
FIG. 6C.
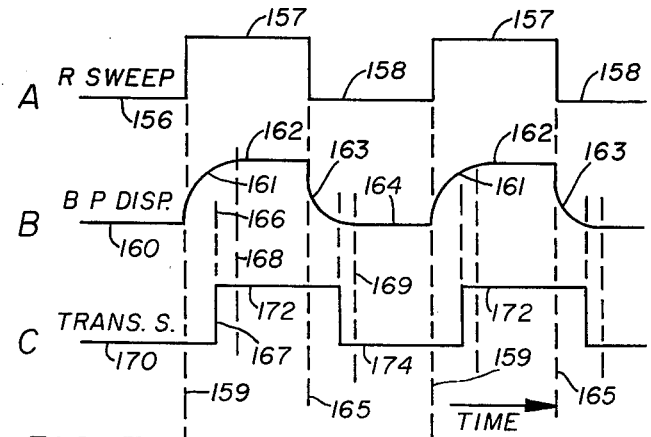
FIG. 7

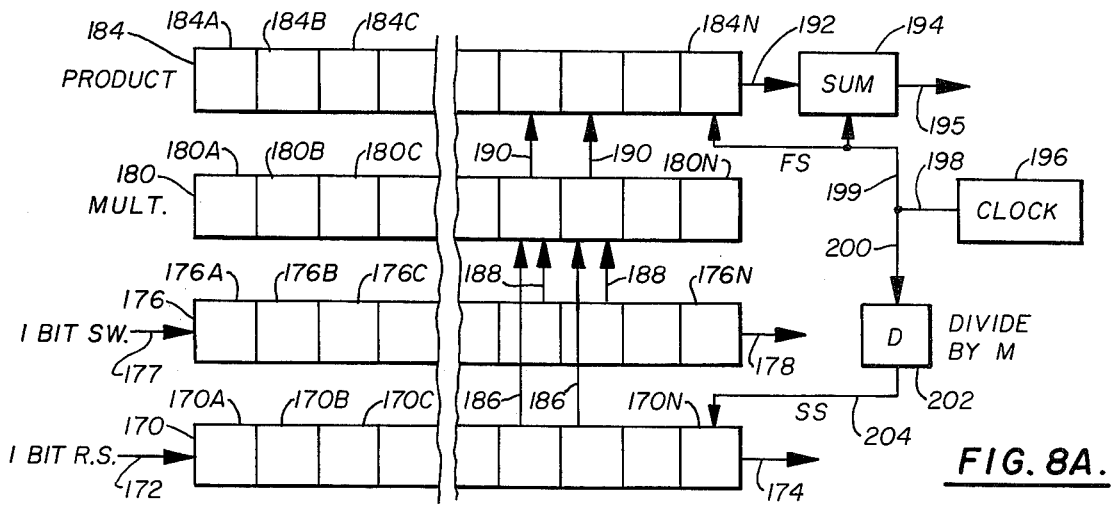
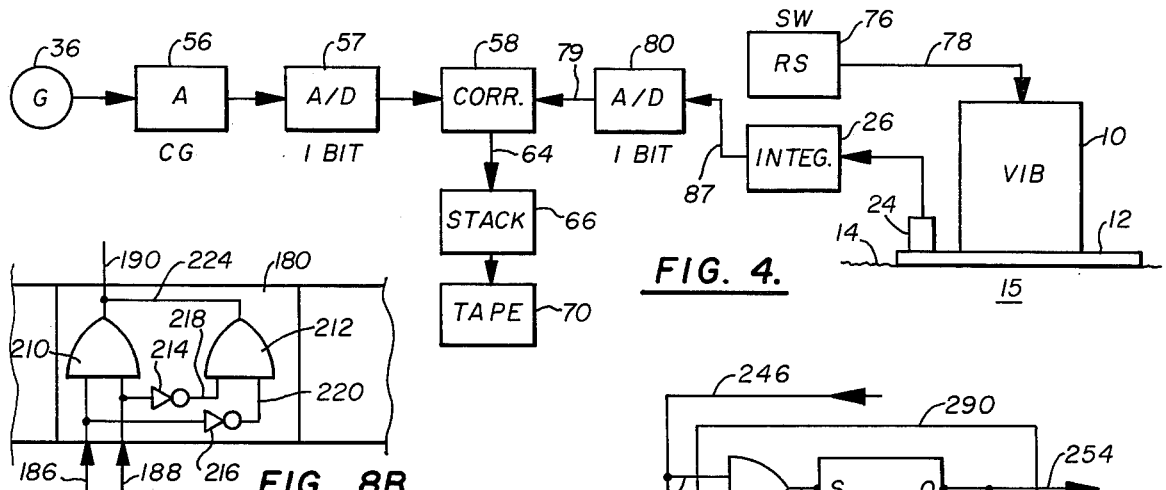

VIBRATOR AND PROCESSING SYSTEMS FOR VIBRATORY SEISMIC OPERATIONS

CROSS REFERENCES TO RELATED APPLICATIONS

This application is a continuation-in-part of my copending application Ser. No. 407,646; filed Oct. 18, 1973; entitled; Parallel Operation of Seismic Vibrators Without Phase Control, now U.S. Pat. No. 3,984,805 which application is entered into this application by reference.

This application is also related to the U.S. Pat. Nos. 3,881,166 and 3,883,725 of Fort et al, which issued respectively, Apr. 29, 1975 and May 13, 1975.

BACKGROUND OF THE INVENTION

In my copending application Ser. No. 407,646, which has been entered into this application by reference, I describe how, in the prior art, in the use of vibration sources in seismic operations, the reference sweeps are sinusoidal signals of variable frequency, of selected frequency bandwidth, and of selected time duration. The need for a sinusoidal sweep signal of multibit amplitude stems from the general opinion widespread in the industry, that each step in the seismic process must be carried out with great fidelity. For example, seismic amplifiers are designed with floating point binary gain amplifiers, that record the signals to 16 bit precision.

In line with this attitude, it has been customary in vibrator operations to provide a sinusoidal reference sweep and a sinusoidal drive sweep to control the vibrator, with the ultimate object of having a sinusoidal output of the vibrator impressed on the earth. To this end, in the phase control of the vibrator, the output of the vibrator is compared in phase with the reference sweep to provide a phase error signal. The phase error signal is then used to shift the phase of the reference signal in a leading direction, or to vary the phase output of a sinusoidal output signal from a computer generator, etc. But the drive signal is maintained as a multibit sinusoidal signal.

Following a somewhat similar procedure, in my copending application Ser. No. 407,646, now U.S. Pat. No. 3,984,805 I teach how to drive the vibrator directly with the reference signal, and then use the output signal of the vibrator to shift the phase of the reference signal in a lagging direction, to provide a counterpart signal, with which to correlate the received signal.

I have dicovered that, in the use of low energy seismic sources, such as vibrator sources, where a large number of repitions of the source are added, or stacked, or composited, to provide a composited signal of sufficiently high signal to noise ratio, for further processing, that the conventional 16 bit signal is not required. As a matter of fact, where there is sufficient noise in the seismic signal, as shown by Fort et al in U.S. Pat. Nos. 3,881,166 and 3,883,725, a plurality of received signals digitized to 1 bit can be stacked and processed to provide results which are indistinguishable from results obtained with 16 bit signals, provided there are enough repetitions of the source.

Furthermore, I have discovered that it is possible to correlate a 1 bit digitized received signal, with a 1 bit digitized reference signal to provide a 1 bit digitized correlated signal, or correlogram, and then to add or composite a plurality of such 1 bit digitized correlograms, to provide a processed record of quality comparable to one processed throughout with multibit signals.

In view of this 1 bit processing of seismic signals, I have discovered that there is great redundancy in the prior art processing of seismic signals, particularly for signals derived from low energy sources.

It is therefor an important object of this invention to use a vibrator that can be driven by a square wave sweep signal, or a sweep signal of 1 bit digitization, and can produce a seismic signal in the earth of square wave form, or a transmitted signal digitized to 1 bit.

It is a further object of this invention to digitize the received seismic signal to 1 bit amplitude, and to correlate the 1 bit received signal with the 1 bit transmitted signal, to provide a 1 bit correlogram, and to composite a plurality of such 1 bit digitized correlograms.

It is a still further object of this invention to generate a square wave reference sweep signal by creating a train of time-spaced pulses of selected values, of variable time spacing, and, responsive to this train of pulses to create a train of square waves of corresponding time duration values.

It is a still further object of this invention to generate from the output movement of the vibrator an electrical "transmitted" signal of square wave shape, or of 1 bit digitization.

It is a still further object of this invention to provide an impulsive force to a vibrator, and provide a vibrator in which the output motion of the vibrator, responsive to the impulsive force is completed in a time which is less than one-half of the shortest period of the train of pulses.

DEFINITIONS

1. A square wave is an analog signal which may be derived from a sinusoidal signal, such as by high amplification and clipping. The square wave has zero crossings at the same times as the zero crossings of the parent sine wave, from which it may have been derived.

2. A square wave can be derived from a time-spaced series of pulses by means of a flip flop or similar type of switch means.

3. A 1 bit digital signal when converted to analog form is a square wave analog signal.

4. The digital form of a square wave analog signal is a 1 bit digital signal, or a "sign" bit signal.

5. A received signal is the electrical signal generated by a geophone, or a group of geophones representing a single channel, responsive to the seismic wave reaching the geophone, at a second point, after passing through the earth, from a source at a first point.

6. A source point is the point on the earth at which the source (vibrator) generates a seismic wave.

7. The reception point is the point on the earth at which a seismic wave is detected and converted into a received signal.

8. A reference sweep signal is an oscillatory electrical signal, generally a multi bit sinusoidal signal, of varying frequency, of selected frequency range, and selected time duration.

9. A square wave reference sweep signal is a square wave electrical signal of varying frequency, of selected frequency range and selected time duration.

10. A square wave vibrator is one, which responsive to a square wave reference sweep signal generates in the earth a substantially square wave of force or displacement.

11. A transmitted signal is an electrical signal representative of the wave shape of the seismic signal generated in the earth by the vibrator.

12. A transmitted signal may be digitized to multiple bit words, or to single bit words. When digitized to single bit words becomes a square wave signal.

BRIEF DESCRIPTION OF THE INVENTION

This invention involves the method of operation of a seismic system utilizing a vibratory source, in which the vibrator generates a substantially square seismic wave at a first point, which is received at a second point, and in which both the received signal and the transmitted signal are digitized to one bit, and the two 1 bit signals are correlated to provide a 1 bit correlated trace. A plurality of repetitions of the source are made and the plurality of correlated traces, or correlograms are stacked.

The vibrator can be a conventional phase controlled vibrator supplied by a multibit sweep with the sweep digitized to 1 bit and correlated with a 1 bit received signal. The vibrator can also be a non-phase-controlled vibrator with the transmitted signal digitized to 1 bit and correlated with the 1 bit received signal. The vibrator can also be a square wave vibrator driven by an impulsive force controlled by a square wave reference sweep. If the response of the vibrator is the same for each impulsive applied force, and is shorter than ½ of the shortest period of the reference sweep, the time delay of the transmitted signal will be constant, and the 1 bit reference sweep signal can be correlated with the 1 bit received signal.

BRIEF DESCRIPTION OF THE DRAWINGS

These and other objects and advantages of this invention and a better understanding of the principles and details of the invention will be evident from the following description taken in conjunction with appended drawings, in which;

FIG. 1 illustrates the prior art driving system of a vibrator.

FIG. 2 illustrates the prior art system of processing vibratory seismic records.

FIG. 3 illustrates the processing system of this invention, applied to the vibrator drive system of FIG. 1.

FIG. 4 illustrates one embodiment of this invention.

FIG. 5 illustrates a second embodiment of this invention.

FIGS. 6A, 6B, 6C, 6D illustrate a novel type of vibrator particularly adapted to the drive system of FIG. 4.

FIG. 7 illustrates the operation of a system like that of FIGS. 6A, 6B, 6C, and 6D.

FIGS. 8A and 8B illustrate a simple logic system for correlating two 1 bit digitized signals.

FIGS. 9A, 9B, 9C illustrate a system for generating a square wave reference sweep signal.

DESCRIPTION OF THE PREFERRED EMBODIMENTS

Referring now to the drawings, there is shown in FIG. 1 the prior art method of controlling a seismic vibrator. The vibrator 10 rests with its baseplate 12 on the surface 14 of the earth 15. This can be a conventional electrohydraulic vibrator in common use in the seismic industry, and no further description is needed.

A reference sweep signal generator 16, may be a radio receiver, a magnetic tap storage means, or an electronic sweep generator, each of which are well known in the art and require no further description. The reference sweep signal is a sine wave of varying frequency of selected time duration and frequency range. The time duration may vary for example, from 6-40 seconds or more, and the frequency might range up or down between the limits of say 8-100 Hz, as is well known.

It has been customary in the industry to go to great pains to generate a true sinusoid, and to control its amplitude in terms of a multi bit digital number, generally of 16 bits.

The vibrator is driven by a similar sinusoidal signal called a "drive sweep" signal 22, which is derived from the reference sweep 16 by means of a phase shifter 20, or equivalent means. The vibrator output into the earth by displacement of the base plate 12 is detected by an accelerometer 24 on the baseplate. This acceleration signal is doubly integrated in integrator 26 and as a "displacement" signal, is compared in phase, in the phase comparator 28 with the reference sweep signal on line 29. The difference in phase is represented by a phase error signal on lead 30 to control the phase shifter to adjust the phase of the drive signal out of 22, on line 23, such that the phase of the base plate will be the same as that of the reference sweep. When this happens, the reference sweep is a facsimile of the transmitted signal and can be used to correlate with the received signal.

This is shown in FIG. 2 which also represents the prior art. A geophone, or geophone group representing one channel, 36 supplies an electrical analog signal representative of the seismic wave reaching the geophone. This is amplified in a high gain, variable gain amplifier 38, generally of the gain ranging, floating point type. This amplified analog signal is digitized to a 16 bit digital number in an analog to digital (A/D) converter 39. The digital train representing the received seismic wave is then stacked with other similar signals derived from repetitions of the source, in the summer 40.

After 10 to 20 or more such digital trains are stacked, the result is a stacked trace and is generally in the form of a 16 bit digitization. This stacked trace is then correlated in correlator 44 along line 42, with the 16 bit reference sweep 16 passed along line 43. The correlation is between two 16 bit signals, and the result is then sent by lead 46 to display 48, or stored on magnetic tape 50, for further processing.

Summarizing the prior art, a reference sweep represented by a multi bit (generally 16 bits) signal controls a vibrator. The vibrator is controlled so that the vibrator output is in phase with the reference sweep. The seismic wave is detected and amplified to form a 16 bit received singal. This is stacked. The stacked 16 bit trace is then correlated in a 16 bit × 16 bit correlator and stored for further processing.

In FIG. 3 is shown one embodiment of this invention. It uses the same vibrator control as in FIG. 1, and the reference sweep signal 62 is digitized to 1 bit the A/D converter 60. The seismic signal from geophone 36 goes by lead 37 to a high gain, constant gain amplifier 56. The signal is then digitized to 1 bit amplitude in A/D converter 57. The 1 bit geophone signal is then correlated in correlator 58 with the 1 bit digitized reference sweep signal. The correlogram of the two 1 bit signals then goes to a stacker or summer 66, through lead 64, where successive repetitions of the vibrator produce successive seismic waves, which produce successive received signal, etc. The result of stacking a plurality of 1 bit signals is a multi bit trace which goes by lead 67 to tape 70 and can then be further processed.

The principal difference between FIGS. 2 and 3 lies in the fact that in FIG. 2 all the signals, and signal processing, are done with 16 bit numbers. Fort et al have shown (U.S. Pat. Nos. 3,881,166 and 3,883,725) where a plurality of signals digitized to 1 bit are stacked, that when the signal includes random noise, that the stacking process results in a multibit signal of substantially the same information content as the same original signals processed 16 bits. This 1 bit processing permits faster, cheaper processing with simpler apparatus.

I have discovered that the seismic signals detected in normal seismic operations contain sufficient random noise, so that no added noise is required to get the benefits of 1 bit stacking and processing.

I have also discovered that instead of correlating a 16 bit stacked signal with a 16 bit sweep, it is possible to correlate 1 bit signals and then stack the 1 bit correlograms. While Fort et al stacked 1 bit received signals and the correlated 16 bit × 16 bit the multi bit stacked traces and the 16 bit sweep, I have found that the 1 bit stacking can be done with the 1 bit correlograms with full benefit, and with a consequent great saving in cost of correlation.

While in the prior art there has been talk of correlation before stacking, with insistence on 16 × 16 bit correlation, there would be a great increase in cost without comparable increase in benefits. However, since 1 ×1 bit correlation is so simple and cheap to perform, a great saving in processing cost is achieved without any loss of information. Of course, the 1×1 bit correlation can be carried out by computer, where the multiply step makes one operation compared to 256 operations for a 16 ×16 bit correlation. However, with 1 bit correlation the processing is simply 1 bit addition, and this can be achieved in a simple register type of adder, as will be described in connection with FIGS. 8A and 8B.

FIG. 3 illustrates the application of this invention to a conventional phase controlled (16 bit) vibrator. By limiting the processing to 1 bit, there is further great simplification in the vibrator apparatus. For example, the generation of the 16 bit reference sweep signal requires rather complicated electronic apparatus. On the other hand, a 1 bit sweep signal requires only the generation of a series of time-spaced pulses, the time spaces being varied, up or down, in period, in accordance with the desired time duration and frequency bandwidth, or terminal frequencies. Having the series of pulses, all that is required is to provide switch means to convert successive pulses into square waves, which is the analog signal corresponding to a 1 bit digital sweep signal. This will be fully described in connection with FIGS. 9A and 9B.

There are also great simplifications possible in the vibrator apparatus itself. For example, the servo valve mechanism of the conventional vibrator, utilizing a 16 bit sweep, is adapted to produce a sinusoidal seismic wave output of the vibrator. This control is expensive and troublesome. If a square wave of sweep is used, then the valving is simpler, being either all on, or all off. This produces a corresponding square wave of pressure and displacement of the earth. This will be further discussed in relation to FIG. 7.

As described in my U.S. pat. application Ser. No. 407,646, I illustrate a double-acting vibrator, including a piston which can be driven up, or down, by detonation of an explosive gas mixture on one side or the other of the piston. These explosions can be timed by the square wave of sweep signal.

With an impulsive force produced by the gas explosion, the vibrator piston moves rapidly to one of its extended positions, and then on the succeeding explosion rapidly returns the piston to the other extended position. If the response time of the vibrator piston, base plate and earth is short, that is, if the time for the earth to move to its extreme position is short, then on each application of the impulsive pressure, the delay of the vibrator is a fixed short time period. Therefor, compared to the square wave of the sweep, the output of the baseplate will be a constant short delay. If this delay is less than ¼ of the shortest period of the sweep, then, although no attempt is made to phase control the vibrator, the output will be a constant time delay behind the square wave of sweep signal, and thus independent of frequency. Thus, the base plate signal itself can be used as a transmitted signal to correlate with the received signal, or the square reference sweep signal can be used to correlate with the received signal.

Referring to FIG. 7, trace A shows a square wave reference sweep, starting as line 156, it rises at time 159 to a constant plus value 157. At time 165 it drops back to zero, or to a negative value 158. Then again at time 159 it rises to 157, etc. If the explosions are timed by the zero axis crossing, or times of rise and fall, 159,165, then the base plate and the earth will move in accordance with the curved rise line 161 (trace B) to a level plus value of 162, and then at time 165 it drops back along the curve 163 to a base, or negative, value of 164, etc. If the time interval between 159 and 168, that is, the response time of the vibrator and earth, is short compared to the half period, time 159–165, then there will be a constant time delay time (159–167) for each operation of the vibrator. The output of the vibrator, represented by trace C, is a square wave transmitted signal, which will be in constant time delay with the reference sweep trace A. Therefor either trace C can be used to correlate with the received signal.

In FIG. 4 is shown another type of vibrator control, which can be a conventional hydraulic vibrator operated with a square wave sweep, that is, one which causes the valve to be fully opened as rapidly as possible, first to the space above the piston, and then to the space below the piston. This is shown by the square wave (SW) reference sweep source (RS) 76, which provides the SW sweep through means 78, driving the vibrator 10. The base plate rests on the surface 14 of the earth 15. An acceleration sensitive sensor 24 is used with a double integrator 26, through lead 87 to a 1 bit digitizer 80. This 1 bit digitized transmitted signal is then correlated (as in FIG. 3) with the 1 bit received signal. A plurality of such correlograms are then stacked.

In FIG. 5 is shown a vibrator 10 with its baseplate 12 resting on the surface 14 of the earth 15. A very heavy mass 88, generally the mass of the truck or other transport vehicle, is supported on columns 90 which rest on compliances or springs 86, which rest on the base plate. When the baseplate oscillates, the heavy mass 88 remains essentially at rest, and the dimension of the compliances 86 is then a measure of the amplitude of motion of the baseplate, and therefor of the earth.

An electrical extensometer or distance measurement means 92 puts out a signal on lead 94 which is a measure of the amplitude of oscillation of the earth. This signal is then digitized to 1 bit, and correlated with the 1 bit digitized received signal as in FIG. 4. The use of this displacement sensor is fully described in my U.S. Pat. No. 3,840,090, which is incorporated by reference into this application.

The impulsive operation of an explosive type vibrator has been described as one in which the output of the vibrator will remain in constant time delay with a square wave of sweep signal.

The conventional electrohydraulic vibrator driven by a square wave of sweep signal will operate as a square wave vibrator, the output operating like an impulsive vibrator. As such it will provide a square wave analog, or 1 bit digitized transmitted signal, in fixed phase relation with the square wave of sweep signal without special phase control means.

Another type of impulsive vibrator is described in relation to FIGS. 6A, 6B, 6C and 6D. In FIG. 6A, the vibrator indicated generally by the numeral 110 comprises a reaction mass 112 and a first frame 114 supported from mass 112 by posts 115, 116. A pair of electromagnetic elements 118, 120 are positioned one on each side of plate 114. Each element has 2 cores. Core 118A is clamped to a second plate 122. Core 120B is clamped to the baseplate 126. Cores 118B and 120A are clamped to plate 114. Each of the two magnetic cores 118A and 18B shown in FIG. 6C have a spiral groove 118C in their mating surfaces. A spiral conductor 128A (FIG. 6D) is wound in the top groove 147 in the core 118A, and a corresponding coil 128B lies in the spiral groove 146 in the lower core 118B, The two coils are connected in series 148C. When a direct current is passed through the two coils in the proper series direction, there will be a force of repulsion between the two cores proportional to the square of the current.

When the current is switched to the lower 2 coils in magnetic element 120, there will be a force tending to press the baseplate 126 against the earth. A corresponding current through leads 128 of the top element, will tend to lift the baseplate. The box 132 is a switching box that passes a current from leads 134 sequentially through the two coils 128,130.

In FIG. 6B is shown a square wave 136, which represents the sweep signal. This controls the switching box 132, so as to pass a current represented by I128, through the magnetic assembly 118, and a second current I130, through the second magnetic assembly 120. Thus the magnetic elements will alternately press the baseplate 126 down, and lift it up, press it down, etc. The switching can be done by electronic switches such as SCR devices, which are well known in the art. Thus, by applying currents I128 and I130 to the two magnetic elements, a square wave of force and displacement is applied against the earth.

Having discovered that stacking a plurality of 1 bit digitized repetitive seismic signals, will recover the true amplitude relations and improve signal to noise ratio (S/N R), it becomes a possibility to correlate a 1 bit digitized sweep signal against a 1 bit digitized received signal. While many more correlations are required (say 20 each 1 bit × 1 bit correlations vs 1 only 16 bit × 16 correlation), the 1 bit correlations are so simple and rapid that there is a great overall saving of computer time to do the correlation as 1 × 1 bit instead of 16 × 16 bits. If the correlation is handled by a conventional computer which is designed to handle 16 bit words, unfortunately there would be no saving of computer time since the 1 bit words of the signals would have to be filled out to 16 bits. However, a special 1 bit correlator, such as illustrated in FIGS. 8A and 8B could be constructed to make the correlation on an "on line" basis.

The correlation of two 1 bit signals is ideally suited to simple logic apparatus. One embodiment of such a correlator is shown in FIGS. 8A and 8B. Shown in FIG. 8A are two long shift registers 176 and 170. The first, 176, can hold the successive 1 bit words of the sweep signal, while the second, 170, holds the successive 1 bit words of the received signal, which is step by step shifted through the register in accordance with arrows 172 and 174. In the register 170 there are a plurality of separate storage units 170A, 170B, 170C . . . 170N, each holding a successive digital word representing separate digitized samples. Similarly, in register 176 there are separate storage inputs 176A, 176B, 176C . . . 176N. In the correlation process, the words stored in 176A and 170A are multiplied, and the product is added to the product of the numbers in 176B and 170B, and so on.

There are a series of logic units 180A, 180B, 180C . . . 180N in an assembly 180. Each logic unit performs the product in the corresponding units of the two registers, each unit of which is connected by leads 186 and 188 to the logic units 180. The result of each multiplication is a 1 bit logical 1 or 0, and this goes by leads 190 to a third shift register 184, in corresponding storage units 184A, 184B, 184C . . . 184N.

There is a high frequency clock 196 which strobes the register 184, and an added 194 by means of leads 198,199. A divider 202 counts down the the clock 196 by a factor M, of say 10,000, and the lower frequency strobes the register 170.

The logic units could be constructed of simple gates as in FIG. 8B. Consider leads 186,188 each connected to corresponding units of the two registers 170,176. In the multiplication of two single bit numbers, we take the product. Thus $1 \times 1 = 1$; $1 \times 0$, or $0 \times 1 = 0$; $0 \times 0$, or $-1 \times -1 = 1$. If leads 186,188 each carry a logical 1, the gate 210 then provides a logical 1 on its output lead 190. If they each carry a logical 0, then the inverters 214, 216 place a logical 1 on leads 218,220 of gate 212, which then produces a logical 1 on lead 224. The combined output lead 190 then carries the logical 1 to the corresponding register unit 184.

In operation, when the register 170 is strobed by the slow strobe SS on lead 204, the train of 1 bit signals is advanced one unit through the register 170. The logic units perform the multiplication and place their outputs on leads 190 into the register 184. When all products have been loaded into register 184, the high frequency strobe, or fast strobe FS then advances all of the products into the adder 194 through lead 192. The output 195 of the adder 194 is now one multibit word representing one value of the correlogram. Because the FS may be 10,000 times faster then the slow strobe SS, the multiply/add steps are computed before the next SS takes place and shifts the received signal one unit.

The 1 bit digitized reference sweep signal can be derived from conventionally generally 16 bit sweep signal, by discarding all bits except the most significant bit, the sign bit. However, the square wave analog sweep signal can be generated much more simply than the conventional multibit sinusoidal sweep signal. All that is required is to generate a series of short time pulses in a selected time-spaced array. The time between pulses would correspond to the half periods of an alternating electrical signal.

Referring to FIG. 9A, there is shown one embodiment of a simple apparatus for generating a time spaced series of pulses. A clock 230 puts out clock pulses on lead 244, this goes to operate a preset-down counter 242. Consider that at the start adder 236 is preset by appropriate signals on lead 234 to a selected digital word on input leads 232. The output leads 240 go to the input of the preset-down counter 242. The clock pulses on lead 244 to the input of 242 count down to zero. When zero is reached, the counter 242 puts out a pulse on lead 246. It also goes via lead 248 to terminal 238, to add a selected digital number into the adder. By placing the pulse on 1 or more input terminals, any desired number can be added. Each cycle of count down of counter 242 makes the output of adder 236 larger, or smaller, depending on which polarity the numbers inserted in terminal 238 are to be applied, plus or minus.

In FIG. 9B is shown one embodiment of simple logic that can convert the series of spaced pulses on line 248 into a square wave signal on lead 254. A flip flop 252 has a Set terminal S and a Reset terminal R on its input, and has Q and $\bar{Q}$ outputs. The Q output leads to output lead 254, and also through delay means 294 and lead 296 to gate 286. Similarly, the $\bar{Q}$ output goes by lead 288 to delay 289 and lead 290 to gate 284. At the start with the flip flop reset, the $\bar{Q}$ is a logical 1, and enables gate 284, while the Q output is a logical 0, and disables gate 186. So the next pulse on line 246 passes through lead 280, through gate 284 and lead 292 to set the flip flop 252. The Q output becomes a logical 1 and provides the first plus half cycle 264 on trace 258 of FIG. 9A. The logical 1 on Q then enables gate 286, while gate 284 is disabled. Thus, the next pulse on 246 resets the flip flop and the Q output drops to a logical 0, and forms the zero (negative) half cycle 266 of trace 258, and so on. Of course, many other logic circuits can be used to perform the actions just described for the circuits of FIGS. 9A and 9B. All such equivalent logic circuits are part of this invention.

It has been shown that the travel time of the seismic wave between the vibrator and the geophones can be determined by correlating the transmitted signal, (which is synchronous with the generated seismic wave in the earth) with the received signal. The transmitted signal (unless the vibrator is phase-controlled) will always lag in phase the reference sweep signal. The amount of this lag in phase can be determined by correlating the transmitted signal with the reference sweep signal. The time delay indicated can then be used to correct the received trace to a time marker corresponding to the reference sweep signal.

While I have spoken of correlating a 1 bit digitized received signal and a 1 bit digitized sweep signal to get a 1 bit correlogram, it will be clear that the process of correlating two 1 bit signals may provide a correlogram of more than 1 bit amplitude. In this case I envision the discarding of all bits other than the sign bit (or digitizing the correlogram to 1 bit) to provide a 1 bit digitized correlogram. The 1 bit digitized correlograms are then stacked to provide a final record. The stacking can be either a straight stack or a C.D.P. stack. In this connection, referring back to FIG. 8A, if the counter 194 is an up-down counter, the sign of the final count will be a 1 bit word indicative of the value of the correlogram at each particular value of tau. It will be clear that appropriate gates may be used to properly time the transfer of the digital bits from registers 170 and 176 to register 184, etc.

It will be clear also, that if a square wave of reference sweep is used, that it is much simpler to transmit this signal from the recording truck to the vibrators (with minimum noise interference) than it is to transmit a sine wave signal. In this case I contemplate using the square wave reference signal to gate a radio carrier on and off in synchronism with the zero crossing times of the square wave signal.

The carrier can be transmitted during the periods in which the sweep signal is positive and to have no carrier during the times that the square wave is zero or negative. It is possible also to have two carrier signals, one of which is gated on when the sweep signal is positive, and the other gated on when the sweep signal is negative or zero.

Also, it is possible to code a radio signal in other well known ways to be easily detected in the presence of noise, the coding being in synchronism with the square waves of the sweep.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. Apparatus for seismic prospecting, comprising;
   a. a force generating means reference sweep signal comprising a square wave analog signal having succeeding plus and minus zero crossings, of variable frequency, of selected band width, and of selected time duration;
   b. a force generating means responsive to said square wave reference sweep signal to create a train of alternately reversing forces on the earth, creating an oscillatory displacement of the earth at a first point on the earth;
   c. means responsive to a sensor means to generate an oscillatory analog electrical signal responsive to said oscillatory displacement of the earth at said first point, and to provide a transmitted signal digitized to 1 bit;
   d. means to detect the seismic wave generated by said force generating means after passing through the earth, at a second point distant from said first point, and, means to produce a detected signal.

2. The system as in claim 1 including means to digitize said detected signal to 1 bit and means to digitize said reference sweep signal to 1 bit and means to correlate said 1 bit detected signal with the 1 bit reference sweep signal.

3. The system as in claim 1 in which said force generator means includes means to generate alternately reversing impulsive forces on the earth, having constant delay time relative to the zero crossing times of said square wave reference sweep signal, whereby there is no variation in time delay between said force generating means and said square wave reference signal, as the frequency of said reference signal changes.

4. The system as in claim 1 in which said vibrator is driven electromagnetically with the current sequentially direct and reversed, responsive to the square wave reference sweep.

5. The system as in claim 1 including means to drive said force generating means explosively, first in one direction and then the other, responsive to plus and minus zero crossings of said square wave reference sweep signal.

6. The system in claim 1 in which said sensor is an accelerometer on the baseplate, and including means to doubly integrate the output, means to low-pass filter the integrated output, and means to digitize to 1 bit the the output of said filter.

7. The system as in claim 1 in which said sensor comprises displacement sensor means across a compliance between a truck weighting means and the baseplate.

8. The system as in claim 1 including a plurality of vibrators each having means to generate different sweeps and including programmable delay means to start each one at a different time after receiving a coded start signal from the recording truck.

9. The system as in claim 1 including hydraulic vibrator means, and including square wave valve means responsive to said square wave reference sweep signal, whereby said valve will change rapidly from full open to full closed, and vice versa.

10. The apparatus as in claim 1 including means to transmit said square wave reference sweep signal to said vibrator by radio, said means comprising; means to generate a radio frequency carrier signal, and means to gate said carrier signal off and on in synchronism with said square wave reference sweep signal.

11. A seismic prospecting system comprising;
  a. means to generate an oscillatory time function of ground motion in the earth, responsive to a square wave reference signal, of a variable frequency, of selected frequency content and time duration, at a first point on the earth;
  b. means to provide an electrical transmitted signal of said oscillatory time function of ground motion, and wherein said electrical transmitted signal varies in phase from said reference signal due to phase shift in said means to generate, and means to digitize said electrical transmitted signal to 1 bit;
  c. means at a second point distant from said first point to detect said ground motion after transmission through the earth, and to produce a received signal, and means to digitize said received signal to 1 bit; and
  d. means to correlate said 1 bit electrical transmitted signal with said 1 bit received signal.

12. The system as in claim 11 including a square wave reference sweep signal to drive said means to generate, and means to correlate said transmitted signal with said reference sweep signal.

13. An improved seismic system comprising;
  a. a vibrator comprising two parts relatively reciprocable, one part attached to a reaction mass, and the other part attached to a base plate positioned on the earth;
  b. a reference sweep signal comprising a square wave signal of variable frequency of selected frequency range and time duration;
  c. means responsive to said square wave reference signal to drive said vibrator so as to impress alternately reversing forces on the earth at a first point on the earth;
  d. means to detect the alternating displacement of said baseplate, and to provide a transmitted signal representative of the seismic wave generated in the earth; and
  e. means to digitize said transmitted signal to 1 bit.

14. The seismic system as in claim 13 including means to drive said vibrator impulsively by said square wave reference signal.

15. Apparatus for seismic prospecting comprising;
  a. a timing means to generate a train of time-spaced unidirectional electrical pulses of continually changing time interval between adjacent pulses;
  b. means to invert alternate pulses to provide a train of alternately reversing electrical pulses;
  c. force generating means responsive to said train of alternately reversing electrical pulses to apply to the earth a corresponding train of alternately reversing forces, at a first point on the earth; and
  d. means to detect the seismic wave generated by said force generating means after passing through the earth, at a second point distant from said first point, and means to produce a detected seismic signal.

16. The system as in claim 15 including means responsive to said timing means to generate a square wave analog electrical signal, each half cycle synchronous with said successive alternately reversing electrical pulses.

17. The system as in claim 16 including means to digitize said detected seismic signal to form a 1 bit digitized received signal, means to digitize said square wave analog signal and including means to correlate said 1 bit digitized received signal and said 1 bit digitized square wave analog signal.

18. The system as in claim 16 including means to transmit said 1 bit digitized transmitted signal to said second point.

19. The system as in claim 18 including means to convert said transmitted signal to a square wave transmitted signal, and means to gate a carrier signal in conformity with said square wave transmitted signal.

20. The system as in claim 15 in which said timing means includes a clock, adder means that is augmented by a fixed number of clock pulses for each cycle of operation, and a preset counter means which is preset to the count of said adder means and counts to zero in accordance with the pulses of said clock.

* * * * *